United States Patent
Barak

(10) Patent No.: US 9,561,973 B2
(45) Date of Patent: Feb. 7, 2017

(54) PHOSPHATE RECOVERY FROM WASTEWATER

(71) Applicant: Phillip Barak, Madison, WI (US)

(72) Inventor: Phillip Barak, Madison, WI (US)

(73) Assignee: Nutrient Recovery & UpCycling, LLC, Madison, WI (US)

( * ) Notice: Subject to any disclaimer, the term of this patent is extended or adjusted under 35 U.S.C. 154(b) by 0 days.

(21) Appl. No.: 14/490,353

(22) Filed: Sep. 18, 2014

(65) Prior Publication Data

US 2015/0001159 A1 Jan. 1, 2015

Related U.S. Application Data

(60) Division of application No. 13/942,900, filed on Jul. 16, 2013, now Pat. No. 8,864,992, which is a continuation of application No. 12/775,230, filed on May 6, 2010, now Pat. No. 8,568,590.

(60) Provisional application No. 61/215,534, filed on May 7, 2009.

(51) Int. Cl.
| | |
|---|---|
| C02F 1/52 | (2006.01) |
| C02F 3/28 | (2006.01) |
| C02F 1/66 | (2006.01) |
| C02F 1/00 | (2006.01) |
| C02F 1/38 | (2006.01) |
| C02F 9/00 | (2006.01) |
| C02F 101/10 | (2006.01) |

(52) U.S. Cl.
CPC ........... *C02F 1/5236* (2013.01); *C02F 1/5245* (2013.01); *C02F 1/66* (2013.01); *C02F 3/286* (2013.01); *C02F 1/001* (2013.01); *C02F 1/385* (2013.01); *C02F 9/00* (2013.01); *C02F 2001/007* (2013.01); *C02F 2101/105* (2013.01); *C02F 2305/14* (2013.01); *Y02E 50/343* (2013.01); *Y10S 210/906* (2013.01)

(58) Field of Classification Search
CPC ......... C02F 1/5236; C02F 1/001; C02F 1/385; C02F 1/5245; C02F 1/66; C02F 3/286; C02F 9/00; C02F 2001/007; C02F 2101/105; C02F 2305/14; Y10S 210/906; Y02E 50/343
USPC .......................... 210/603, 702, 723, 724, 631
See application file for complete search history.

(56) References Cited

U.S. PATENT DOCUMENTS

| | | | | |
|---|---|---|---|---|
| 3,505,012 A | * | 4/1970 | Thomas | C01B 25/325 23/304 |
| 4,696,746 A | * | 9/1987 | Ghosh | C02F 3/286 210/218 |
| 5,360,546 A | * | 11/1994 | Tomita | C02F 1/5254 210/603 |

(Continued)

FOREIGN PATENT DOCUMENTS

| | | | |
|---|---|---|---|
| EP | 2511243 | * | 10/2012 |
| WO | WO2011/089019 | * | 7/2011 |
| WO | WO2012/098171 | * | 7/2012 |

OTHER PUBLICATIONS

English translation of the abstract WO2012/98171, Jul. 2012.*
English translation of the abstract EP2511243, Oct. 2012.*

*Primary Examiner* — Fred Prince
(74) *Attorney, Agent, or Firm* — Bell & Manning, LLC

(57) ABSTRACT

Provided are methods for recovering phosphate from wastewater by treating the wastewater with calcium containing compounds to raise its pH to near neutral values in order to precipitate calcium phosphate compounds, such as brushite, from the wastewater.

8 Claims, 11 Drawing Sheets

(56) References Cited

U.S. PATENT DOCUMENTS

| | | | | |
|---|---|---|---|---|
| 5,665,240 | A * | 9/1997 | Hong | C02F 1/5236 |
| | | | | 210/201 |
| 5,928,403 | A * | 7/1999 | Moore, Jr. | A01K 1/0152 |
| | | | | 71/21 |
| 5,993,503 | A * | 11/1999 | Kruidhof | C05F 3/00 |
| | | | | 435/268 |
| 6,290,637 | B1 * | 9/2001 | Eighmy | B09B 1/00 |
| | | | | 405/129.25 |
| 6,569,342 | B1 * | 5/2003 | Willuweit | B09C 1/08 |
| | | | | 210/714 |
| 7,780,994 | B2 * | 8/2010 | Lynn | A61L 27/46 |
| | | | | 424/401 |
| 2006/0124541 | A1 * | 6/2006 | Logan | C02F 3/1215 |
| | | | | 210/605 |
| 2006/0194299 | A1 * | 8/2006 | Brinch-Pedersen | A23K 1/08 |
| | | | | 435/183 |
| 2007/0241041 | A1 * | 10/2007 | Shimamura | C02F 11/127 |
| | | | | 210/197 |
| 2012/0073473 | A1 * | 3/2012 | Buri | C09D 5/028 |
| | | | | 106/417 |

* cited by examiner

PHOSPHATE RECOVERY FROM WASTEWATER

CROSS-REFERENCE TO RELATED APPLICATIONS

The present application is a divisional of U.S. patent application Ser. No. 13/942,900, filed on Jul. 16, 2013, which is a continuation of U.S. patent application Ser. No. 12/775,230, filed on May 6, 2010, which claims priority to U.S. provisional patent application No. 61/215,534, filed on May 7, 2009, the entire contents of each of which are hereby incorporated by reference.

TECHNICAL FIELD

The present invention relates to a process and system for recovering phosphate from the waste stream at sewage treatment plants.

BACKGROUND OF THE INVENTION

Phosphorus is both a plant and animal nutrient and an environmental contaminant in the modern world, implicated as a major source of eutrophication of surface waters. Both urban and agricultural waste streams contain phosphorus that entered the element cycle as a nutrient but that is difficult to remove and recover in a recyclable form and, therefore, is more nuisance than nutrient. Sewage treatments plants are obliged to reduce phosphorus levels in discharge water to low levels, but typically do so by directing the phosphorus to the sewage sludge, or biosolids, which are usually land applied. In doing so, sewage treatment plants are often faced with nuisance formation of phosphate minerals, principally struvite, in pipes, heat exchangers, and tanks due to the high levels of phosphate produced during anaerobic digestion of the solids. The biosolids have an unfavorably high phosphorus/nitrogen ratio, so that if biosolids are land-applied to meet crop nitrogen needs then the added phosphorus exceeds crop needs and will either accumulate to undesirable levels in the soil or be prone to runoff losses with erosion. Rock phosphate mineral resources for fertilizer production are nonrenewable and limited to another century at current rates of use.

The production of biosolids in sewage treatment plants employs anaerobic digestion of a combination of two feedstocks: first, primary sludge produced by produced by settling and grit removal of the raw sewage, and second, waste activated sludge produced from the treated water by biological nutrient removal using polyphosphate accumulating organisms to accumulate phosphorus in their biomass before wasting to be anaerobically digested as part of the biosolids.

A number of methods have been devised to recover phosphorus from sewage treatment plants. There are basically two processes to recover phosphorus from wastewater using crystallization reactions: the hydroxylapatite process and the magnesium ammonium phosphate process. In the hydroxylapatite process, a calcium source is added into the wastewater and phosphorus is recovered in the form of calcium phosphate (Hirasawa et al, 1981a, 1981b, 1981c). In the magnesium ammonium phosphate process (Ohlinger et al., 1998; Durrant et al., 1999; Shimamura et al., 2003; Yoshino et al, 2003), a magnesium source is added (often as magnesium chloride), sometimes with the addition of base (sodium hydroxide or magnesium oxide) to raise pH of the water treatment, and the phosphorus is recovered in the form of magnesium ammonium phosphate hexahydrate, i.e., struvite.

Such methods for phosphorus recovery have been proposed to be located either before or after the anaerobic digestion of primary sludge and waste activated sludge. FIG. 1, points 1 and 2, shows the location of such P removal methods in a typical wastewater treatment plant. U.S. Pat. No. 7,182,872 (Barak, et al., 2007), as well as Jaffer et al. (2002), Britton et al. (2005), Bhuiyan et al. (2008) and Le Corre et al. (2007), considered the filtrate or the centrate of the anaerobic digesters at sewage treatment plants, as in such as FIG. 1, point 2, as the most promising spot for struvite formation, with the primary deficiency—insufficient magnesium concentration in the filtrate—to be addressed by addition of magnesium chloride (or magnesium-saturated cation exchange resins, per Barak (2007) and pH to be adjusted upward if needed by addition of sodium hydroxide. Accordingly, Barak, et al. (2007) discloses a method and apparatus for removing phosphorus as struvite from filtrate or centrate from anaerobic digester of a sewage treatment plant by means of a negatively-charged compressed monolayer, self-assembled monolayer, or polymeric cation exchange membrane. Alternatively, U.S. Pat. No. 6,338,799 (Fukushima, et al.) discloses a method for recovering phosphate from waste activated sludge in a phosphorus-releasing tank before anaerobic digestion, such as FIG. 1, point 1. The process includes treating sludge drawn from a water treatment system at a sewage treatment plant in an anaerobic condition to release polyphosphate accumulated in the sludge into solution, and recovering phosphate in the solution using a seed crystal material. The system for recovering phosphate from sludge includes a phosphorus-releasing means for treating sludge drawn from a water treatment system at a sewage treatment plant in an anaerobic condition to release phosphate into the bulk liquid, a dewatering and separating means for separating the sludge containing the solution including the released phosphate into dewatering effluent and dewatered sludge, a calcium ion concentration-adjusting means for adjusting the calcium ion concentration in the dewatering effluent, a means for adjusting the pH of the dewatering effluent to pH 7.5 to 9, and a crystallizing means for recovering phosphate from the calcium ion concentration-adjusted, pH-adjusted effluent of dewatering apparatus.

In recent years, multi-phase anaerobic digesters have been introduced that entail a sequence of organic acid digester, thermophilic digester, and mesophilic digester. FIG. 1 (bottom) shows such a multiphase anaerobic digester. The purpose of such an arrangement is to optimize environmental conditions for the several microbial processes involved in anaerobic digestion and thereby enhance methane production in the thermophilic phase and produce biosolids with reduced pathogen content. Key to the multi-phase process is the organic acid digester, which produces low molecular weight organic acids from digestible carbohydrates at mesophilic temperatures by processes of acidogenesis and acetogenesis, with a retention time of several days. The organic acid digest then passes to the thermophilic digester where, at higher temperature and higher pH, the microbial process of methanogenesis produces methane in the form of biogas.

SUMMARY OF THE INVENTION

Described herein is a technology that captures up to 90% of the phosphorus in a usable form that can either be recycled to agriculture directly, or returned for reprocessing as a high-grade phosphate ore, which would have otherwise exited the sewage treatment plant as biosolids. This technology manipulates the supernatant of the multi-phase anaerobic digestion process midstream, as opposed to releasing a portion of the phosphate from the activated sludge before anaerobic digestion (Fukashima, et al.) or treating the filtrate or centrate at the end of anaerobic digestion as described by others. This technology takes advantage of the fact that phosphate is released from the biomass of polyphosphate accumulating organisms in the waste activated sludge and those phosphates are highly soluble in the mildly acidic environment of the organic acid digester caused by the decomposition of the digestible carbohydrates of the primary sludge. The adoption of a three-phase anaerobic digestion system that entails an organic acid digester, a thermophilic digester, and a mesophilic digester presents an opportunity to remove phosphorus after it has been solubilized during the process of acetogenesis and before it is re-precipitated in the solid phase in the thermophilic digesters, as in FIG. 1, point 3.

Such high levels of soluble phosphate in the organic digester are particularly prone to controlled precipitation when pH values are brought to near neutral values, especially when additional calcium (or magnesium) is added to the mix. This may be accomplished by adding base either in the form of calcium carbonate and its calcined products, calcium oxide (lime) and calcium hydroxide (slaked lime); dolomite (calcium magnesium carbonate) and its calcined products; magnesite and its calcined products; or calcium-saturated weak-acid ion exchange resin. Calcium-saturated resin may be prepared using either the bases—calcium carbonate, calcium oxide, or calcium hydroxide—or alternatively a fraction of the calcium bicarbonate-containing effluent water, in which case a closed system has been created that does not require any further materials addition to the working wastewater treatment plant.

For a more complete understanding of the phosphate recovery system and process of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

In the preferred embodiment, an organic acid digester uses primary sludge and waste activated sludge as feedstocks and produces high concentrations of volatile fatty acids. Typical suspended solids load of 2 to 4%., expected pH is 4.6 to 5.1, soluble phosphorus concentrations are 500 to 1200 mg/L, and retention times are 1.5 to 4 days.

In the first preferred embodiment, the organic acid digest is treated for phosphorus recovery before it is added to the thermophilic or mesophilic digesters. Such treatment may permit additional screening, floatation, sedimentation, filtration, or centrifugation of large particles in the digest before phosphate removal from the remaining liquid portion.

Phosphorus recovery from the organic acid digest is effected by raising the pH to near neutral value, not to exceed pH 7, and adding calcium by means of addition of calcium carbonate, calcium hydroxide, calcium oxide, calcium magnesium carbonate, calcium magnesium hydroxide, or calcium magnesium oxide to the organic acid digest.

Figure 2:
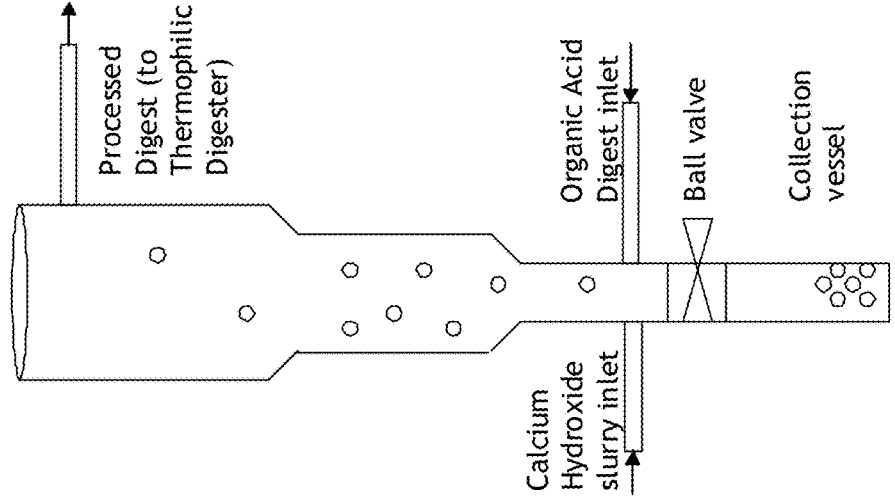
FIG. 2 is a preferred embodiment of the organic acid digest treated with calcium hydroxide for phosphate recovery by sedimentation against an up-welling flow in a fluidized bed reactor apparatus with particle size segregation.

The resulting calcium phosphate product is to be collected by sedimentation (either static sedimentation in a settling tank or sedimentation in an upwelling flow as in a fluidized bed reactor, as depicted in FIG. 2), filtration, or centrifugation. The processed organic digest is sent to the thermophilic digester for methanogenesis.

In the second preferred embodiment, the organic acid digest either with or without particle removal, is applied to an ion exchange column loaded with weak acid exchangers of the carboxylate, phosphonic, aminophosphonic, or other weak acid functional groups, loaded predominantly with the calcium ion. Operation will be much like that of standard ion-exchange columns used for water softening. After the column is spent, resulting calcium phosphate particles in the column are to be removed by backwashing with tap water or plant effluent. The column will be regenerated and returned to the calcium form by using calcium carbonate, calcium hydroxide, calcium oxide, or either tap water or plant effluent containing soluble calcium bicarbonate.

In the third preferred embodiment, the organic acid digest is treated for phosphorus recovery and returned to the organic acid digester. As in the first and second embodiments, additional screening, floatation, sedimentation, filtration, or centrifugation of large particles in the digest is permitted before phosphate removal from the remaining liquid portion. Phosphate recovery will effected by either reaction with calcium compounds as in the first embodiments or calcium-saturated resins as in the second.

EXPERIMENTAL EXAMPLE 1

In 2007, operators of the Nine Springs wastewater treatment plant, Madison Metropolitan Sewage District, Madison, Wis., replaced their single stage, mesophilic anaerobic digestion system with a multi-phase process and thereby separated the organic acid production from the biogas production, as is increasingly practiced in the U.S. (see US-EPA, 2006) and elsewhere. Large quantities of struvite were forming in the heat exchangers warming up the organic acid digest before entry into the thermophilic digesters and in the thermophilic digester itself, in the form of grit that sank to the bottom of the digester tank and restricted the effective volume of the digester.

Figure 1:
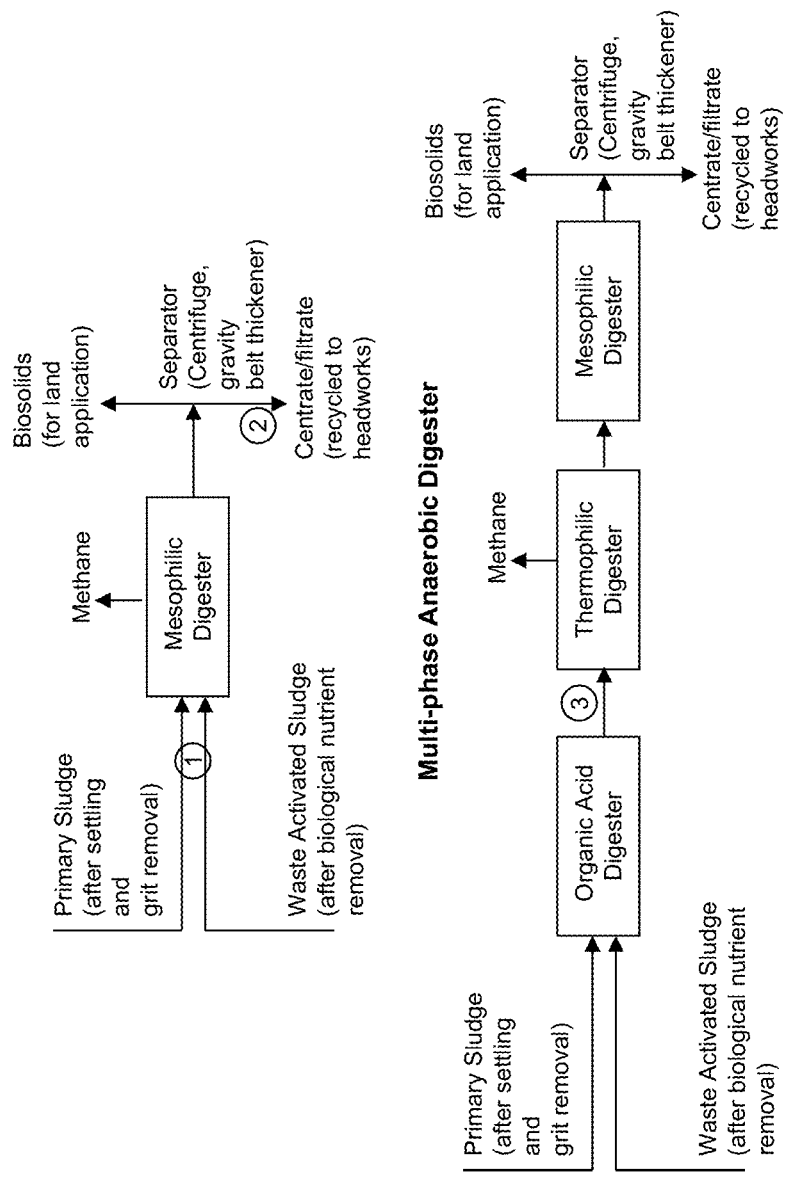
FIG. 1 is a schematic diagram of the preferred embodiment of a temperature-phased anaerobic digestion facility of the phosphate recovery system of the present invention, with the location of phosphorus recovery labeled 3, compared with a conventional anaerobic digester and placement of phosphorus recovery methods labeled 1 and 2.

On 8 Aug. 2007, 4-L samples were collected at the outflow of each of the digesters and the filtrate (FIG. 1) at the Nine Springs Wastewater Treatment Plant, Temperature and pH were measured immediately. Characterization of the soluble components by collection of dialyzate was begun immediately by placing dialysis bags (Spectra/Por 7 Dialysis Membrane, MWCO: 50000; Spectrum Laboratories, Inc., Rancho Dominguez, Calif.) containing 25 mL of deionized water into the 4-L samples, shaking intermittently for 3 hrs. Chemical analysis of the anaerobic digester dialyzates (see TABLE 1) showed significant chemical differences among them. The organic acid digester had a high concentration of volatile fatty acids, mostly acetic and propionic acids, and a pH of 4.69. This was in marked contrast to the slightly alkaline pH of the dialyzates of the later thermophilic and mesophilic phases of the digestion process. Also of interest were the high concentrations of phosphate, calcium, and magnesium in the organic acid digester dialyzate, particularly in comparison to the later phases. From the first stage of digestion (acid digest) until the centrifugation process, dissolved (dialyzable) phosphorus dropped from 18.5 mM to 6.2 mM (161 ppm $PO_4$—P; see TABLE 2), calcium dropped from 5.3 mM to 0.61 mM (24.3 ppm, see TABLE 2) and magnesium dropped from 6.6 mM to 0.2 mM. The drop in phosphate, calcium, and magnesium concentrations between the organic acid digester and the thermophilic digester suggests the precipitation of calcium phosphates and struvite into the biosolids during the pH transition. Chemical modeling of the solutions (not shown here) also suggests that this may be so.

Phosphorus concentrations in the GBT filtrate at the end of anaerobic digestion process at the Nine Springs Plant are high compared to other waste water plants and published values (TABLE 2). However, a higher concentration phosphorus source is to be found upstream in the organic acid digester in those plants with a multistage anaerobic digestion process. In light of this observation, the effectiveness of various phosphorus removal treatments was determined based on the organic acid digest.

TABLE 1

Analyses of Digester Samples at MMSD and Their Dialyzates.

| | | Organic Acid | Thermophilic Reactors | | | Mesophilic Reactors | | | GBT Filtrate |
|---|---|---|---|---|---|---|---|---|---|
| Digest: | | 7 | 6 | 5 | 4 | 3 | 2 | 1 | |
| EC, dS/m | | 4.48 | 6.33 | 6.30 | 5.95 | 6.10 | 6.32 | 6.38 | 7.69 |
| pH | | 4.69 | 7.53 | 7.53 | 7.53 | 7.46 | 7.49 | 7.47 | 7.67 |
| Temp, ° C. | | 38.6 | 51.8 | 52.2 | 52.3 | 39.4 | 38.6 | 39.2 | 34.1 |
| Solids, % | | 5.10 | 2.60 | 2.50 | 2.70 | 2.30 | 2.20 | 2.40 | 0.20 |
| Ca, % of solids | | 1.69 | 3.89 | 3.76 | 3.81 | 4.15 | 4.10 | 4.02 | 1.37 |
| Mg, % " | | 0.90 | 0.90 | 0.94 | 0.86 | 0.79 | 0.69 | 0.74 | 0.77 |
| P, % " | | 0.71 | 3.68 | 3.63 | 3.61 | 3.75 | 3.61 | 3.64 | 6.58 |
| Dialyzate: | | | | | | | | | |
| EC | dS/m | 5.82 | 8.23 | 8.19 | 7.74 | 7.93 | 8.22 | 8.30 | 8.39 |
| Ca | mM | 5.3 | 0.4 | 0.5 | 0.5 | 0.5 | 0.6 | 0.6 | 0.6 |
| Mg | " | 6.6 | 0.3 | 0.3 | 0.2 | 0.6 | 0.4 | 0.6 | 0.2 |
| Na, | " | 9.4 | 10.3 | 10.3 | 10.2 | 10.0 | 10.0 | 10.0 | 10.6 |
| K | " | 6.2 | 6.1 | 6.1 | 6.0 | 5.8 | 5.9 | 5.9 | 5.8 |
| $Fe^{2+}$ | " | 0.7 | 0.0 | 0.0 | 0.0 | 0.0 | 0.0 | 0.0 | 0.0 |
| $Mn^{2+}$ | " | 0.1 | 0.0 | 0.0 | 0.0 | 0.0 | 0.0 | 0.0 | 0.0 |
| $NH_4^+$ | " | 25.5 | 62.2 | 60.6 | 60.0 | 65.2 | 65.5 | 65.6 | 65.1 |
| P | " | 18.5 | 6.2 | 6.3 | 6.3 | 5.8 | 5.7 | 6.0 | 5.2 |
| Cl | " | 9.5 | 11.0 | 10.9 | 10.9 | 10.9 | 10.8 | 10.6 | 11.4 |
| S | " | 1.0 | 0.2 | 0.2 | 0.2 | 0.2 | 0.1 | 0.3 | 0.2 |
| Acetic acid | " | 22.9 | 0.4 | 0.4 | 0.4 | 0.3 | 0.3 | 0.3 | 0.2 |
| Propionic acid | " | 21.4 | 0.0 | 0.0 | 0.0 | 0.0 | 0.0 | 0.0 | 0.0 |
| N-Butyric acid | " | 4.9 | 0.1 | 0.1 | 0.1 | 0.1 | 0.1 | 0.1 | 0.1 |
| N-Valeric acid | " | 2.4 | 0.0 | 0.0 | 0.0 | 0.0 | 0.0 | 0.0 | 0.0 |
| IsoButyric acid | " | 1.2 | 0.1 | 0.1 | 0.1 | 0.1 | 0.1 | 0.1 | 0.1 |
| IsoValeric acid | " | 0.8 | 0.0 | 0.0 | 0.0 | 0.0 | 0.0 | 0.0 | 0.0 |
| SecValeric acid | " | 0.6 | 0.0 | 0.0 | 0.0 | 0.0 | 0.0 | 0.0 | 0.0 |

TABLE 2

Reported Soluble Phosphorus Concentrations in Centrate or Filtrate Following Anaerobic Digestion.

| Location | P | Ca | Mg | Literature source |
|---|---|---|---|---|
| | mg/L, (=ppm) | | | |
| British Columbia | 71 | — | 28 | A. Britton et al., 2005 |
| Slough, England | 94.9 | 56 | 44 | Jaffer et al., 2002 |
| Milwaukee, GBT filtrate | 4.0 | 32.1 | 42.2 | Barak et al., unpublished |
| Madison, GBT filtrate | 161 | 24.2 | 4.9 | GBT filtrate, this study |

To prepare synthetic organic acid digest approximating the composition of the organic acid dialyzate sampled on 8 Aug. 2007, 1.284 g of magnesium acetate, 1.512 g of monobasic calcium phosphate, 0.816 g of monobasic potassium phosphate, 0.526 g of sodium chloride, and 1.927 g of ammonium acetate were added to a 1-L graduated flask and were dissolved in an acidic environment by adding acetic acid to a final pH of 4.67. Acetic acid was prepared by making up 10 g of glacial acetic acid to 500 mL with deionized water (335 mM) and then adding about 80 mL of the dilute acetic acid solution, sufficient to reach the target pH, to the other chemicals. The solution was then made up to 1 L with deionized water and stirred continuously using a magnetic stirrer for about 12 hours.

The synthetic organic acid dialyzate contains several overlapping pH buffers: volatile fatty acids, e.g., acetic acid (pK 4.75); phosphate (p$K_2$ 7.2) and ammonium (pK 9.3). Initial experiments indicated that some of the carbonate minerals might not be reactive and they were therefore calcined to oxides for comparative purposes.

High purity calcite ($CaCO_3$), dolomite ($CaMg(CO_3)_2$), and magnesite ($MgCO_3$) were ground to pass a 100-mesh sieve and calcined at 1000° C. for 8 hrs. The calcined materials, now in their oxide forms, were cooled in a dessicator and stored in sealed containers to avoid conversion to hydroxides and carbonates. Laboratory-grade sodium carbonate was used as a control in uncalcined form since it was readily soluble.

Calcium- and magnesium-saturated cation exchange resins of the weak-acid, carboxylic type, were prepared by neutralizing Amberlite IRC-50 (Mallinckrodt Chem. Works, St. Louis, Mo.; C.P., medium porosity, 20-50 mesh size (wet), total exchange capacity: 3.5 meq/mL min., supplied in W-form) with dilute ammonium hydroxide, rinsed with DI water, left in calcium chloride or magnesium chloride brines solutions overnight, and then rinsed with deionized water until the electrical conductivity was <100 dS/m. Excess water was removed with suction on a Buchner funnel and moist resins were stored for use.

Various weighed amounts of the calcined carbonate minerals and the calcium- and magnesium-saturated resins were added to 40-mL aliquots of the synthetic organic acid dialyzate in test tubes and shaken gently for 48 hrs. At 2, 4, 8, 24 and 48 hr, pH values were measured and shaking was resumed. After 48 hrs, when it was determined that the chemical reaction between the dialyzate and the added materials was completed, the tubes were centrifuged at 10,000×g for 20 min. Samples of supernatant were taken for analysis by ICP-OES and solids resuspended in the remaining solution were transferred for light microscopy (Leica DML, Leica Microsystems Wetzlar GmbH, Nuhsbaum, Inc). The sizes of these crystalline particles were measured using Image J software (Version: 1.39u, http://rsb.info.nih.gov/ij/, National Institutes of Health). Select samples were analyzed by x-ray diffraction at the S.W. Bailey X-ray Diffraction Laboratory (Dept. of Geology and Geophysics, UW-Madison) using a Scintag Pad V powder diffractometer with copper Kα radiation for identification of the minerals formed; experimental conditions were 45 KeV, 40 mA, 0.02 degree step size, and 2 s dwell time per step.

Figure 3:
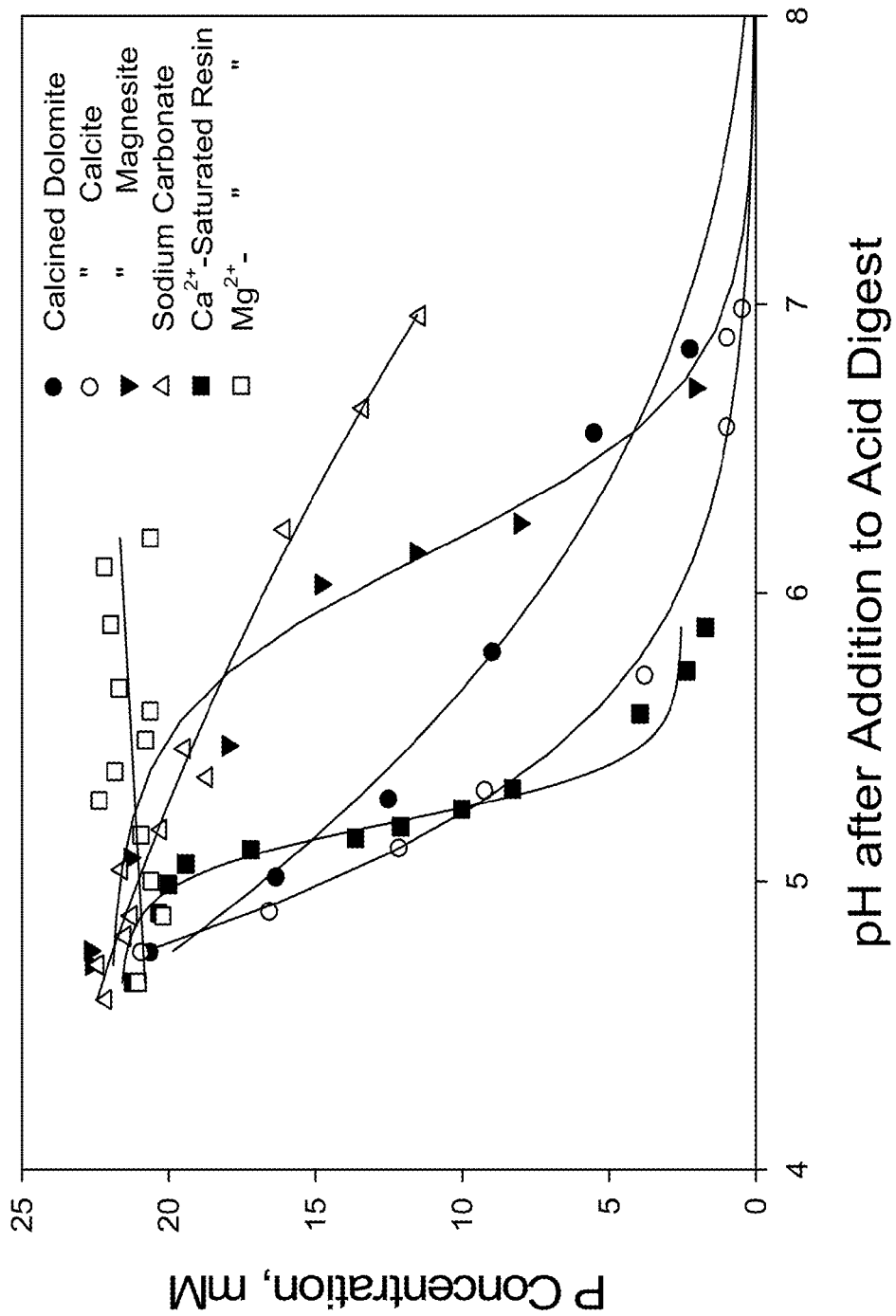
FIG. 3 is a summary of the relationship between phosphorus remaining in solution after the various treatments—calcined carbonate minerals, sodium carbonate, and ion exchange resins as a function of pH conditions induced by the treatments.

FIG. 3 is a graphical comparison between the phosphorus remaining in solution after the various treatments-calcined carbonate minerals, sodium carbonate, and ion exchange resins as a function of pH conditions induced by the treatments. The soluble phosphorus in the synthetic organic acid solutions after treatment with the several calcined carbonate minerals, sodium carbonate, and metal-saturated resins shows that phosphorus removal is foremost a matter of raising pH from the initial value of about 4.8 to neutrality or above. Sodium carbonate, used here as a control, raises pH and precipitates phosphate as calcium phosphate, but not very effectively since it relies on the initial calcium of the acid digest to do so; at pH 7, it has precipitated about half of the initial P. By contrast, calcium oxide (calcined calcite) both raised pH by reacting with the acidity of the organic acids in the digest and supplied additional calcium to promote calcium phosphate precipitation; by pH 6.5, about 95% of the soluble phosphorus had been precipitated. Magnesium oxide (calcined magnesite) will form magnesium ammonium phosphate, struvite, at near-neutral and alkaline pH using the added magnesium, but below neutrality the effect is largely like that of sodium carbonate, i.e., precipitating calcium phosphate using the initial calcium available in the acid digest; by pH 7, about 90% of the soluble phosphorus has been precipitated, mostly as calcium phosphate. Calcined dolomite, providing an equivalent amount of CaO and MgO, splits the difference between the calcined calcite and calcined magnesite behavior; it only begins to induce precipitation of magnesium phosphates such as struvite at near-neutral and alkaline pH. Taking the acid digest into more alkaline conditions by adding either dolomite or magnesite favors struvite formation but it may be recognized that phosphate precipitation with calcium to form brushite ($CaHPO_4.2H_2O$), as opposed to struvite ($MgNH_4PO_4.6H_2O$), is fundamentally advantageous to the removal of acidity since one mole of $H^+$ is co-precipitated for each P removed. As a locally-available material, the use of dolomite might be favored and its calcination could be accomplished with some of the energy from the combustion of biogas. Although the work with calcined minerals was accomplished here using batch experiments, the use of either dolomite or calcite might employ a fluidized bed reactor instead.

The use of weak-acid carboxylic ion exchangers to raise solution pH is fundamentally different from the use of oxides and carbonates, which react with the organic acids to produce $H_2O$ and $CO_2$, respectively, plus the appropriate organic (alkaline) anion. Instead, the weak-acid ion exchangers have an affinity for $H_3O^+$ similar to that the organic acids themselves, with the addition of some additional electrostatic effects due to their polyvalent nature. Here, a calcium-saturated weak acid resin, though introducing no alkalinity into the organic acid digest, induced a pH rise from 4.8 to 5.9 and, in the process of doing so, precipitated 90% of the soluble phosphorus as calcium phosphates and thereby behaving very much like calcined calcium carbonate. This treatment with calcium-saturated resin bears further investigation. The addition of magnesium-saturated resin raised solution pH by the same mechanism but served as a sink for the initial calcium instead of a source of additional calcium for phosphate removal and was the only treatment tested that failed to precipitate at least some phosphorus.

Separate analyses of the weak-acid cation exchange resin in equilibrium with the organic acid digest found that an exchangeable cation suite of 52% $H^+$, 26% $Ca^{2+}$, 14% $Mg^{2+}$, 4% $NH_4^+$, 4% $Fe^{2+}$, and 1% each $Na^+$ and $K^+$, with a total charge of 5.6 mmol(+)/g. If transferred to Madison city water or MMSD effluent, the exchangeable H+ and other constituents would be entirely replaced with calcium and magnesium by compulsive ion exchange, with the bicarbonate alkalinity of the water reacting with the acidity. Although the use of calcium-resin was here performed using batch experiments, the use of ion exchange columns for field testing will likely be superior.

EXPERIMENTAL EXAMPLE 2

The synthetic organic acid solutions used did not contain the microbial biomass of the original digest and its effects on phosphate removal by precipitation could not be predicted. Further, the work with the synthetic acid digest used centrifugation at 10,000×g for 20 minutes to separate supernatants and sediments, yet the observations using light microscopy showed typical particles sizes in the sediment that could have been separated by centrifugal forces and treatment times more friendly to the wastewater treatment plant than was used in the laboratory. Therefore, the effectiveness of calcined calcite in precipitating phosphate from the real organic acid digest from a working wastewater treatment plant was tested and the phosphorus precipitates identified.

On 14 Mar. 2008 and 29 May 2008, samples were collected at the outflow of the organic acid digester ('Digester #7') into the thermophilic digester at the Nine Springs wastewater treatment plant, Madison Metropolitan Sewage District, Madison, Wis. Temperature and pH were measured immediately. Collection of dialyzate was begun immediately by placing dialysis bags (Spectra/Por 7 Dialysis Membrane, MWCO: 50000; Spectrum Laboratories, Inc., Rancho Dominguez, Calif.) containing 25 mL of deionized water into the 4-L sample containers, shaking intermittently for 3 hrs, after which dialyzates were removed from the dialysis bags, electrical conductivity was measured in the dialyzates and the dialyzates were analyzed for mineral constituents by inductively coupled plasma-optical emission spectroscopy (ICP-OES), volatile fatty acids by gas chromatography, and chloride by ion chromatography. The specific gravity and relative viscosity of the digest were measured at 20° C. and 40° C. using a 50-mL pyknometer and a lab-built Ostwald viscometer with a 25-mL reservoir, respectively.

Calcined calcite was prepared by heating powdered calcitic limestone at 1000° C. for 4 hr. Calcined calcite was added to 40-mL aliquots of the organic acid digests, with the highest rate intended to bring the pH of the digest close to neutral or above. The samples were shaken for 48 hr and then centrifuged at 179 relative centrifugal force (1000 rpm) for 4 min, of which 2 min was acceleration to the desired speed and 2 min at the desired speed. The centrifugal force and duration of centrifugation were chosen based on digest density and viscosity that would, following Stokes Law:

$$V_s = \frac{2}{9} \frac{(\rho_p - \rho_f)}{\mu} g R^2$$

where $V_s$ is terminal settling velocity;
R is particle radius;
g is centrifugal or gravitational force, here calculated for a centrifuge where relative centrifugal force=11.17 r $(\omega/1000)^2$, with a 16-cm centrifuge radius, and $\omega$ is angular velocity in revolutions per min;
$\rho_p$ is particle density;
$\rho_f$ is density of the fluid, here 1.000 at 40° C. for the organic acid digest;
$\mu$ is viscosity of the fluid, here a relative viscosity of 1.13 at 40° C., that would cause a brushite particle of 0.1 mm radius and density of 2500 $kg/m^3$ to settle 9 cm and thereby clear the supernatant in the 40-mL centrifuge tubes used.

The 0.1 mm dimension was chosen based on preliminary experiments with synthetic dialyzates wherein the size of the brushite crystals varied from about a 0.02 mm to 1.5 mm based on light microscopy and image analysis using ImageJ (v. 1.39u, http://rsb.info.nih.gov/ij/, National Institutes of Health).

After centrifugation, the supernatant was separated from the sediment by aspiration, with subsamples dried at 105° C. to determine percent total solids, and then ashed at 550° C. to remove organic matter. The ashed supernatant was dissolved in 1% $HNO_3$, filtered, and analyzed by ICP-OES. Sediments after centrifugation were dried at 60° C. Subsamples were inspected by light microscopy and by x-ray diffraction using a Scintag Pad V powder diffractometer with copper K$\alpha$ radiation for identification of the minerals formed. Experimental conditions were 45 KeV, 40 mA, 0.02 degree step size, and 2 s dwell time per step.

The organic acid digests were acidic, pH 4.67 and 5.00 on the two sampling dates, and solutions contained considerable concentrations of Ca, Mg, and phosphorus (see TABLE 3) compared to the digests of thermophilic digesters. Compared to the results of the earlier sampling date, 8 Aug. 2007, and the later date, 28 May 2008, the composition of the 14 Mar. 2008 was unusually high in Fe and relatively low in P. Discussion with the operators of the Nine Springs plant revealed that during that time the operators were adding considerable amounts of ferric chloride to the organic acid digester in an attempt to reduce the pH and reduce foaming. This treatment had the undesirable consequence of causing the formation of vivianite, $Fe_3(PO_4)_2 \cdot 8H_2O$, in the heat exchangers and was discontinued, whereupon the level of soluble Fe dropped and level of soluble phosphorus rose by the time of the 28 May 2008 sampling, which resembled the August 2007 results.

Figure 4:
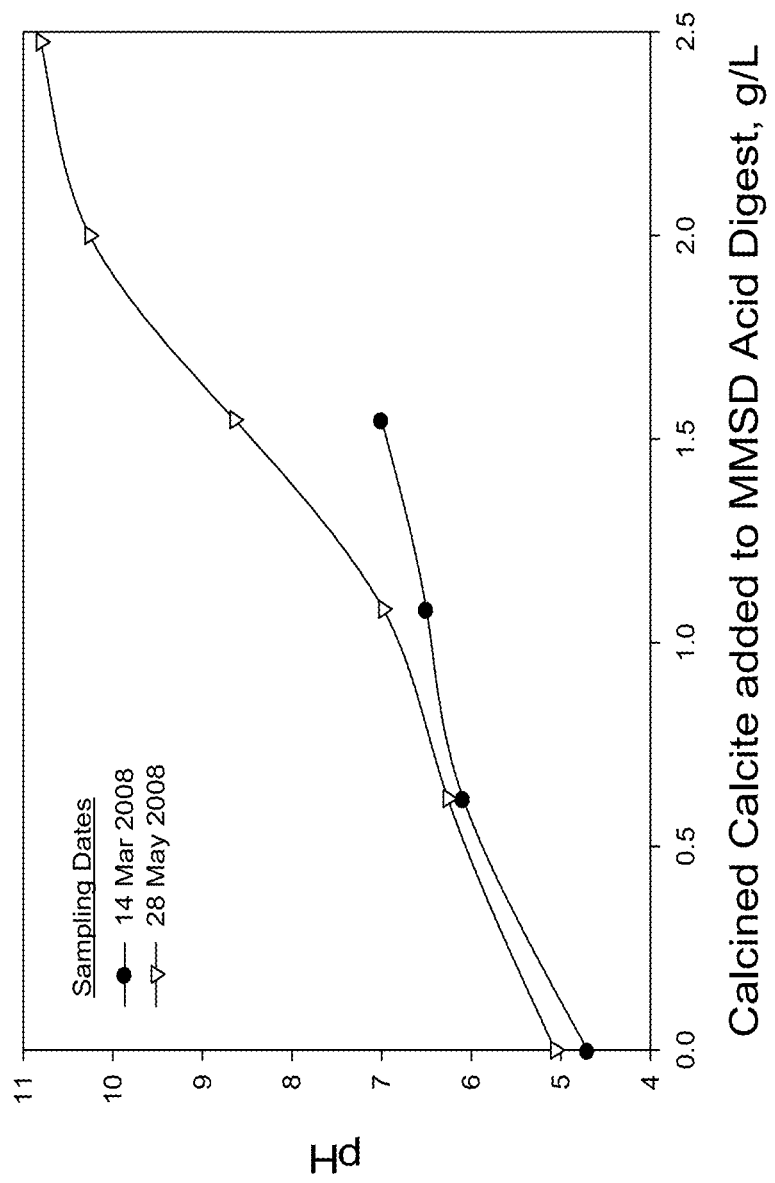
FIG. 4 is a pH titration of digest with calcined calcite using the temperature-phased anaerobic digestion process of the present invention.
Figure 5A:
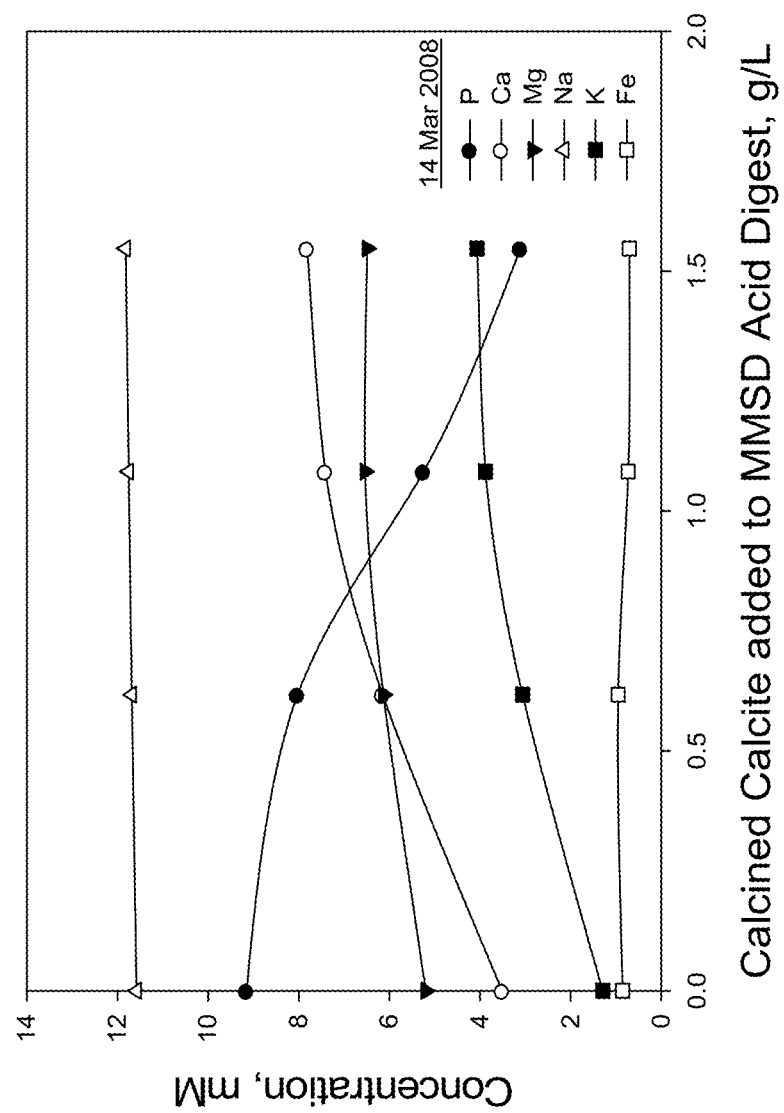
FIG. 5A is a chemical analysis of acid digest after reaction with calcined calcite (14 Mar. 2008) using the temperature-phased anaerobic digestion process of the present invention.
Figure 5B:
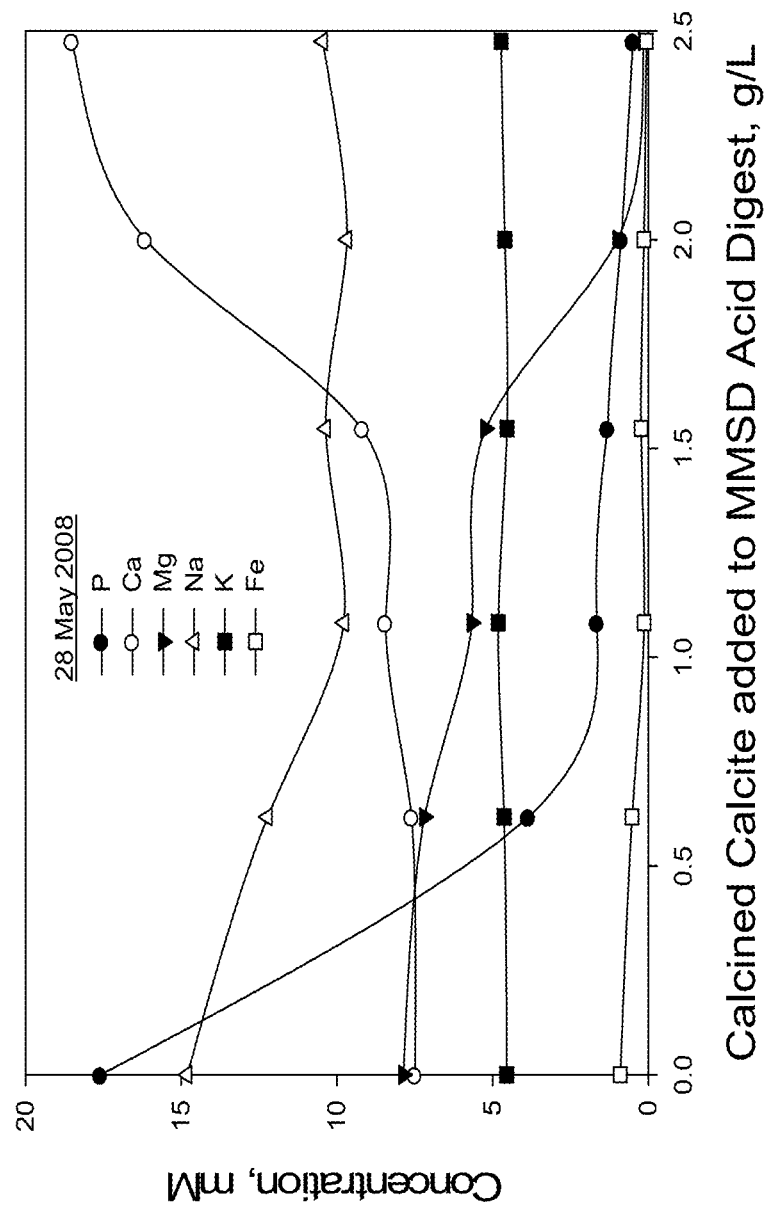
FIG. 5B is a chemical analysis of acid digest after reaction with calcined calcite (28 May 2008) using the temperature-phased anaerobic digestion process of the present invention.

The rates of calcined calcite to neutralize the organic acids in the digests and raising pH to about 7 were 1.55 and 1.1 g per L acid digests for 14 March and 28 May, respectively (see FIG. 4). Analysis of the total solids in the supernatant (see TABLE 3) shows that the addition of calcined calcite did not cause general precipitation of the suspended solids. Chemical analyses of the supernatants demonstrate that phosphorus in the organic acid digest was removed from solution as pH was raised with calcined calcite, dropping from about 9 mM in the untreated digest to 3 mM with 1.55 g/L calcined calcite in the earlier sampling date (see FIG. 5A), and from about 17 mM to 2 mM with 1.1 g/L calcined calcite on the latter sampling date (see FIG. 5B). These treatments did not alter the concentrations of soluble iron, sodium, or potassium; soluble magnesium increased slightly with addition of calcined calcite, perhaps due to small impurities of magnesium in the source rock. Also, concentrations of calcium remaining in the digests did not increase in proportion to the amount of calcined calcite added until after the phosphorus concentrations had been reduced. On raising the pH above 7, there is a decline in magnesium concentration in the supernatant, perhaps indicative of precipitation of magnesium phosphates and magnesium ammonium phosphates.

Figure 6:
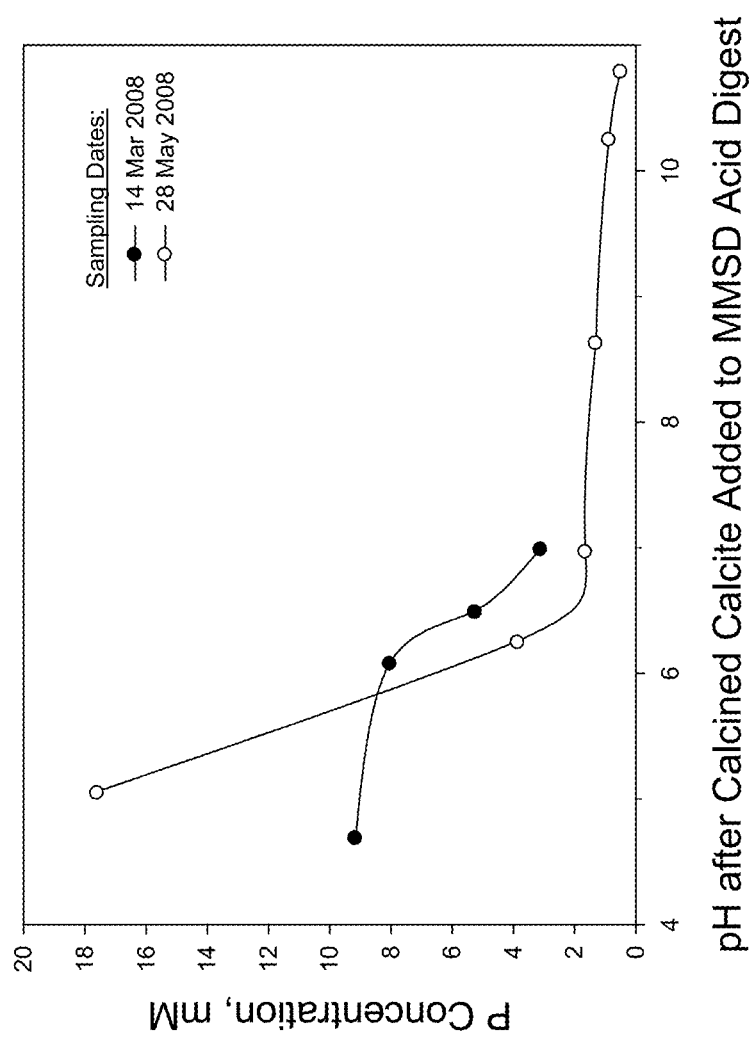
FIG. 6 discloses the relationship between phosphorus remaining in solution after the calcined calcite treatment—as a function of pH conditions induced by the treatment.

Referring now to FIG. 6, when the concentration of phosphorus in the supernatant is considered as a function of pH, it becomes clear that there is a portion of the initial phosphate that is not precipitated under these conditions. This may be phosphorus in the suspended biomass itself since the calcined calcite treatment did not clear the digest completely of its contents (TABLE 4). Interestingly, the digest with the higher initial phosphorus content, that of 28 May 2008, had the greater amount of phosphorus removed upon being neutralized and the remaining phosphorus was brought to a lower concentration after neutralization; the amount of calcined calcite required for neutralization was less than that required for the 14 Mar. 2008 sample.

Figure 7A:
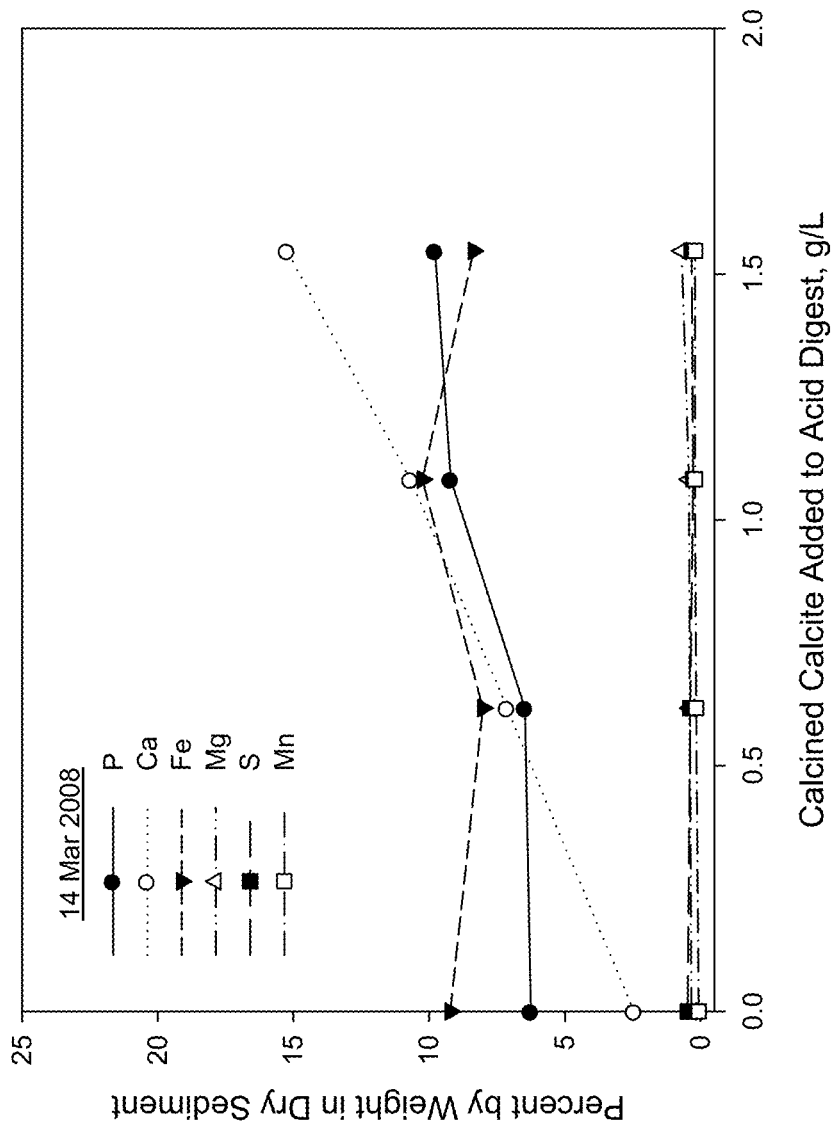
FIG. 7A depicts the chemical analysis of sediment from the acid digest after reaction with calcined calcite (14 Mar. 2008) using the temperature-phased anaerobic digestion process of the present invention.
Figure 7B:
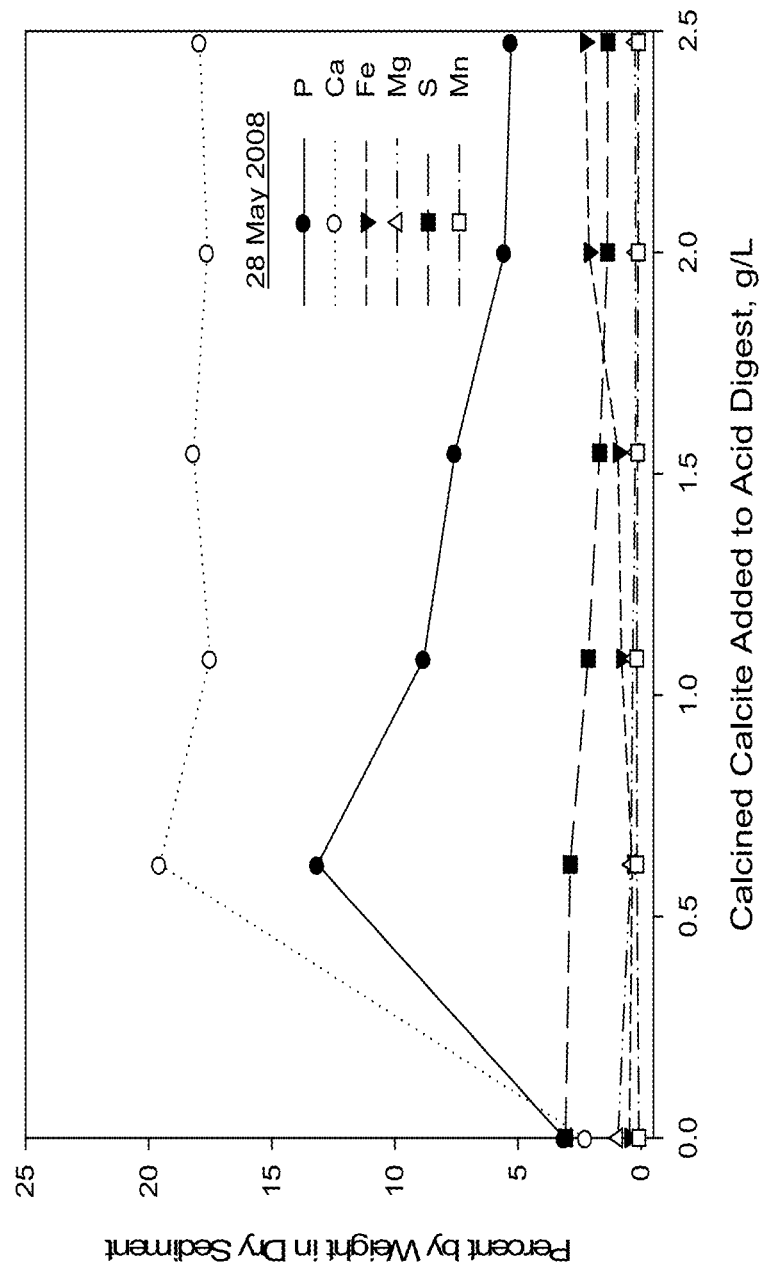
FIG. 7B depicts the chemical analysis of sediment from the acid digest after reaction with calcined calcite (28 May 2008) using the temperature-phased anaerobic digestion process of the present invention.

Chemical analysis of the sediments, as depicted in FIG. 7A, demonstrate that the 14 Mar. 2008 organic acid digest had a relatively high content of iron and phosphorus that could be removed by centrifugation, independent of the treatment. The 28 May 2008 organic acid digest, which better represented normal operational conditions, had a high percentage of phosphorus in the sediments, as high as 13% by weight (see FIG. 7B). The major auxiliary element was calcium, suggesting that calcium phosphates are the major constituent.

Figure 8:
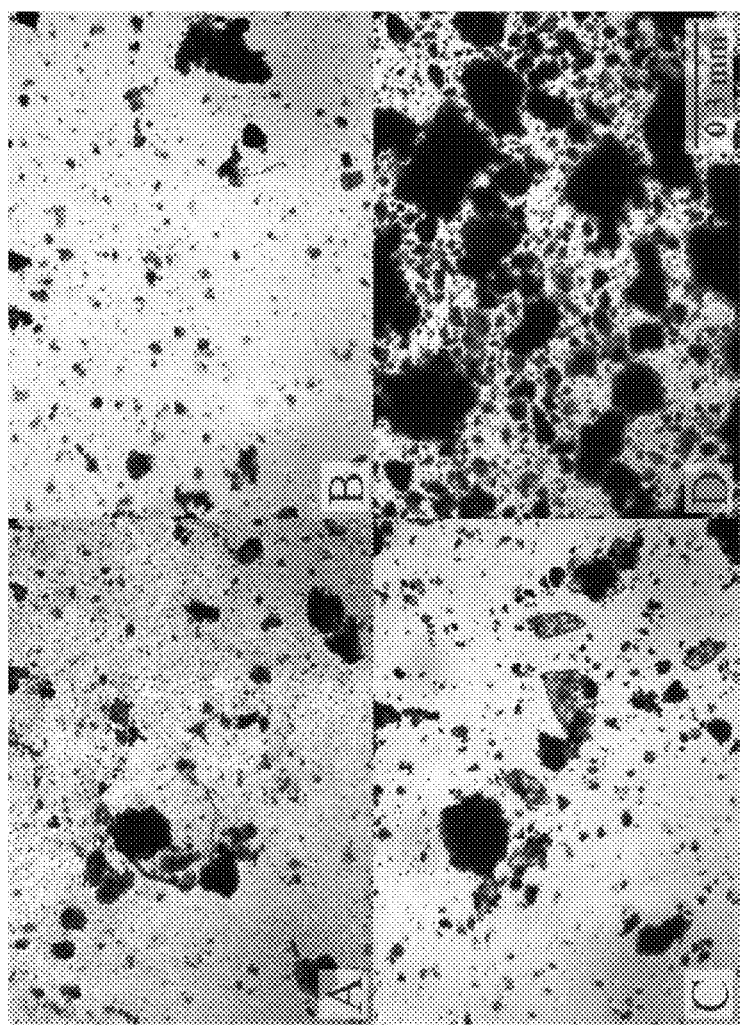
FIG. 8 depicts the precipitated solids from organic acid digest (14 Mar. 2008) upon addition of calcined calcite. A) top left, untreated digest; B) 0.62 g/L, pH 6.09; C) 1.08 g/L, pH 6.5; D) 1.55 g/L, pH 7.

The precipitated solids were examined under the microscope to examine the shape, size and the formation of crystals. The acid digest sample with the calcined calcite sufficient to raise the pH to 7 had the greatest number of crystals, as shown in FIG. 8, and precipitation of the crystals was seen to increase on increasing the amount of calcined calcite added. The crystals formed in the acid digest were similar in appearance to those formed in the earlier experiments with the synthetic acid digest. They were platy in structure and were observed to be nucleated on the surface of calcined calcite particles. The size of the crystals varied from about 0.02 mm to 1.5 mm, similar to the previous study with synthetic acid digest using calcined carbonates.

Figure 9:
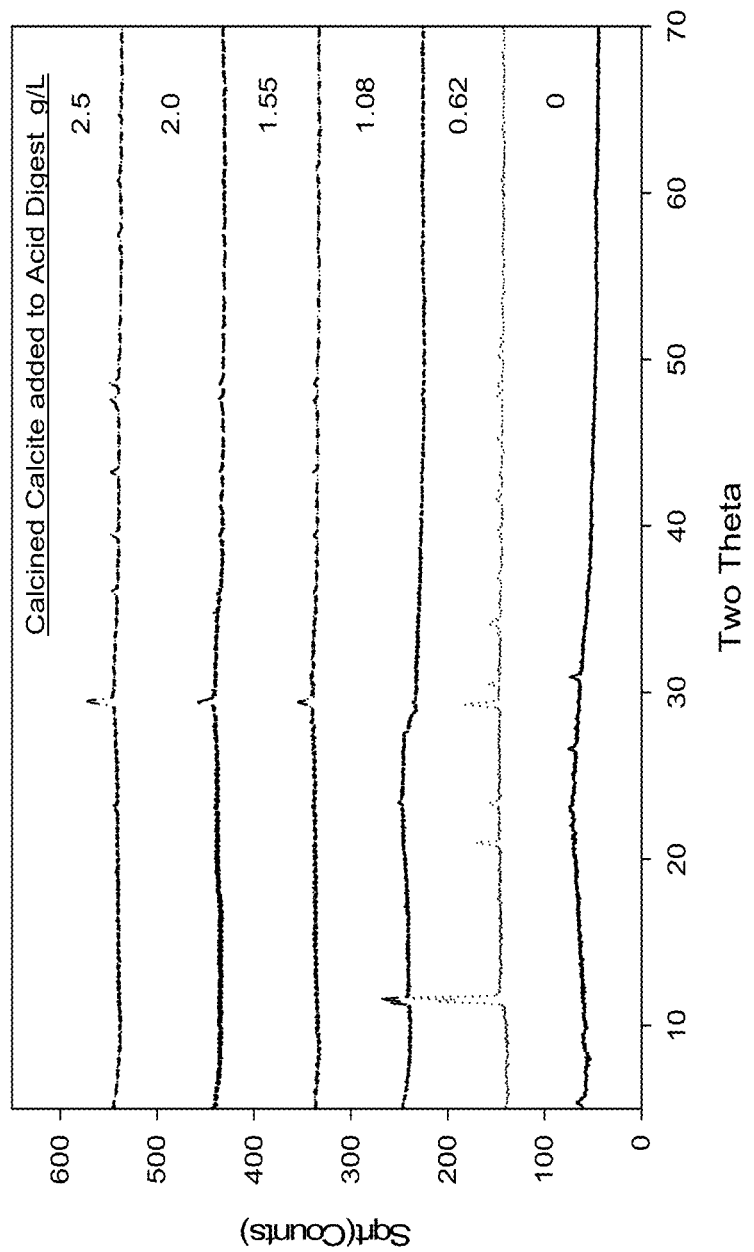
FIG. 9 are X-ray diffraction patterns of precipitated solids from real acid digest sampled (28 May 2008) using the temperature-phased anaerobic digestion process of the present invention.

Upon examination by X-ray diffraction, it was observed (FIG. 9) that the predominant mineral that had formed in the real acid digests was brushite, particularly when the digest was still acid. For the first sampling date, brushite and small amounts of magnesium phosphate were identified at pH values ranging from 6.1-7. For the second sampling date, at pH values ranging from 6.2-7, along with the mineral brushite, a small amount of gypsum was also identified; at yet higher pH (8.6-10.8), substantial amount of calcite mineral phases were identified. For both the sampling dates, untreated digest did not show signs of any mineral phase identifiable by x-ray. Given the relatively low peak counts, it is possible that a significant portion of the precipitated solids did not give strong x-ray diffraction, and may therefore be regarded as 'amorphous' for the purpose of x-ray identification. Amorphous calcium phosphate is expected to have the same utility as crystalline calcium phosphate in the form of brushite, both for agronomic purposes and as a phosphorus ore for industrial purposes.

Under working conditions, the phosphate precipitates can be recovered by sedimentation (either static or upwelling flow), centrifugation, or filtration (such as a gravity belt thickener). It may be envisioned that the organic digest may be pretreated by sedimentation, centrifugation, or filtration to remove entrained grit and non-phosphate particles so that such particles are not collected together with the phosphate precipitates produced by raising the pH and adding calcium and magnesium.

From these results it can be seen that raising the pH and adding calcium through addition of calcined calcite to the organic acid digest remove phosphorus from the anaerobic digester, thereby reducing its nuisance value and recovering it for recycling as a plant nutrient.

TABLE 3

Test Results - Chemical Composition of Digests and Dialyzates of Digests from MMSD.

| | | 08 Aug 2007 | | 14 Mar 2008 | | 28 May 2008 | |
| --- | --- | --- | --- | --- | --- | --- | --- |
| | | Organic Acid | Thermo-philic | Organic Acid | Thermo-philic | Organic Acid | Thermo-philic |
| Digest: | | | | | | | |
| pH | | 4.69 | 7.53 | 4.67 | 7.01 | 5.0 | 7.52 |
| Temp, °C. | | 43.6 | 52 | 28.7 | 43.6 | 31.2 | 49.6 |
| Dialyzate: | | | | | | | |
| EC, dS/m | | 5.82 | 8.2 | 5.92 | 7.17 | 3.56 | 6.47 |
| P | mg/L | 572.23 | 159.98 | 275.4 | 47.78 | 440 | 193 |
| K | " | 241.37 | 237.88 | 182.2 | 191.7 | 229 | 246 |
| Ca | " | 213.4 | 17.68 | 310.0 | 91.3 | 203 | 28 |
| Mg | " | 159.98 | 6.21 | 119.5 | 46.9 | 138 | 20 |
| S | " | 30.9 | 5.9 | 22.9 | 2.6 | 9.7 | 4.8 |
| $Mn^{2+}$ | " | 5.07 | 0.02 | 5.44 | 0.10 | 7.0 | 7.0 |
| $Fe^{2+}$ | " | 38.7 | 0.9 | 286.3 | 1.05 | 9.8 | 9.8 |
| Na | " | 217.14 | 237.2 | 243.9 | 261.6 | 236 | 238 |
| $NH_4$—N | " | 357 | 871 | 334.4 | 757.6 | 218 | 620 |
| $CL^-$ | " | 338 | 389.9 | 812.2 | 962.8 | 362 | 355 |
| Acetic acid | " | 1372 | 21.7 | 1397 | 185 | 1519 | 8.46 |
| Propionic acid | " | 1589 | 0.5 | 929 | 140 | 718 | 1.67 |
| IsoButyric acid | " | 103 | 5 | 72.3 | 7.1 | 68 | ND* |
| IsoValeric acid | " | 79.8 | 4.9 | 51.6 | 6.51 | 57.6 | ND* |
| N-Butyric acid | " | 436 | 5 | 295 | 34.2 | 406 | ND* |
| N-Valeric acid | " | 242.9 | 4.9 | 174 | 22.6 | 141 | ND* |
| SecValeric acid | " | 60.2 | 4.9 | 41.7 | 5.05 | 38.5 | ND* |

*Not Determined

TABLE 4

Percentage of Total Solids in Organic Acid Digests after Addition of Calcined Calcite.

| | Calcined calcite added, g/L acid digest | | | | | |
|---|---|---|---|---|---|---|
| Sampling Date | 0 | 0.62 | 1.08 | 1.55 | 2.0 | 2.5 |
| | - - - Percent total solids - - - | | | | | |
| 14 Mar 2008 | 0.50 | 0.62 | 0.78 | 0.675 | | |
| 28 May 2008 | 0.43 | 0.44 | 0.48 | 0.47 | 0.58 | 0.55 |

LIST OF REFERENCES

Barak, P., M. E. Tabanpour, M. Avila-Segura and J. M. Meyer. 2007. Struvite Crystallization. U.S. Pat. No. 7,182,872; rights assigned to WARF.

Bhuiyan, M. I. H., D. S. Mavinic and F. A. Koch. 2008. Phosphorus recovery from wastewater through struvite formation in fluidized bed reactors. Water Sci. Technol. 57(2):175-181.

Britton, A., F. A. Koch, D. S. Mavinic, A. Adnan, W. K. Oldham and B. Udala. 2005. Pilot-scale struvite recovery from anaerobic digester supernatant at an enhanced biological phosphorus removal wastewater treatment plant. J. Environ. Engin. Sci. 4:265-277.

Durrant, A. E., M. D. Scrimshaw, I. Stratful and J. N. Lester. 1999. Review of the feasibility of recovering phosphate from wastewater for use as a raw material by the phosphate industry. Environ. Technol. 20:749-758.

Fukushima, Y., T. Matsumoto, K. Kawabata, and K. Moriyama. 2002. Method for recovering phosphate from sludge and system therefore. U.S. Pat. No. 6,338,799 B1. Jan. 15, 2002.

Hirasawa, I., K. Okada, Y. Hoshino, K. Shimada and M. Nagauchi. 1981b. Studies on phosphorus removal by contact crystallization from sewage (2). J. Japan Sewage Works Assoc. 18(204):38-45.

Hirasawa, I., K. Okada, Y. Hoshino, K. Shimada and M. Nagauchi. 1981c. Studies on phosphorus removal by contact crystallization from sewage (3). J. Japan Sewage Works Assoc. 18(205):11-19.

Hirasawa, I., K. Okada, Y. Hoshino, K. Shimada and M. Nagauchi. 1981a. Studies on phosphorus removal by contact crystallization from sewage (1). J. Japan Sewage Works Assoc. 18(203): 12-21.

Throughout this application, various patents, and publications are referenced. The disclosures of these documents in their entireties are hereby incorporated by reference into this specification in order to more fully describe the state of the art to which this invention pertains.

It is evident that many alternatives, modifications, and variations of the phosphate recovery system and process of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A process removing phosphates from wastewater containing solubilized phosphates, the process comprising the steps of:
    raising the pH of the wastewater to a pH of less than 8 by adding calcium containing compounds to the wastewater, whereby solubilized phosphates are precipitated and brushite is the predominant mineral in the precipitated phosphates; and
    removing the precipitated phosphates mixed with a magnesium phosphate, a magnesium ammonium phosphate, biosolids, iron, gypsum, or a combination thereof from the wastewater.

2. The process of claim 1, wherein the calcium containing compounds comprise calcium oxide or calcium hydroxide.

3. The process of claim 1, wherein the calcium containing compounds consist of calcium oxide or calcium hydroxide.

4. The process of claim 1, wherein the pH is raised to a value of no greater than 7.

5. The process of claim 1, wherein the pH is raised to a value in the range from 6.1 to 7.

6. The process of claim 1, further comprising removing non-phosphate particles from the wastewater prior to raising the pH of the wastewater.

7. The process of claim 1, wherein the wastewater comprises an organic acid digest from an organic acid digester.

8. The process of claim 7, further comprising the steps of:
    p1 feeding at least one of a primary sludge or a waste activated sludge comprising the wastewater into the organic acid digester, wherein digestible carbohydrates in the sludge undergo acidogenesis and acetogenesis to provide the organic acid digest having an acidic pH and comprising volatile fatty acids;
    wherein the step of raising the pH of the wastewater to a pH of less than 8 by adding calcium containing compounds to the wastewater comprises raising the pH of the organic acid digest to a pH of less than 8 by adding the calcium containing compounds to the organic acid digest.

* * * * *

UNITED STATES PATENT AND TRADEMARK OFFICE
CERTIFICATE OF CORRECTION

PATENT NO.         : 9,561,973 B2                                                  Page 1 of 1
APPLICATION NO.    : 14/490353
DATED              : February 7, 2017
INVENTOR(S)        : Phillip Barak It is certified that error appears in the above-identified patent and that said Letters Patent is hereby corrected as shown below:

In the Specification

Column 8, Line 41:
Delete "one mole of W" and replace with --one mole of $H^-$--

In the Claims

Claim 8, Column 14, Line 44:
Delete "p1"

Signed and Sealed this
Sixth Day of June, 2017

Michelle K. Lee
*Director of the United States Patent and Trademark Office*